United States Patent [19]
Weakley

[11] 3,860,411
[45] Jan. 14, 1975

[54] SUGAR PRODUCTION
[75] Inventor: Martin L. Weakley, Pryor, Okla.
[73] Assignee: Nipak, Inc., Dallas, Tex.
[22] Filed: July 27, 1972
[21] Appl. No.: 275,863

Related U.S. Application Data
[63] Continuation-in-part of Ser. No. 135,811, April 20, 1971, abandoned.

[52] U.S. Cl. .................................................. 71/119
[51] Int. Cl. .............................................. A01n 9/20
[58] Field of Search ................................. 71/119, 76

[56] References Cited
UNITED STATES PATENTS
3,711,273  1/1973  Mitchell............................... 71/120

OTHER PUBLICATIONS
Carles, Ann. Physiol. Vegetable, 2, 5-18 (1960).
Gadet et al., Am. Inst. Nat'l. Recherche Agnon., Ser. A, Agnov., 10, 609-60 (1959).
Hunter et al., Sci. Soc. Am. Proc., 30(1), 77-81 (1966).
Jurkowska, Acta Agn. Silvestnia, Ser. Agn., 7 (2), 63-69 (1967).
Chemical Abstracts, Vol. 51, Col. 9816(b) 1957.
Chemical Abstracts, Vol. 54, Col. 13288(a) 1960.
Chemical Abstracts, Vol. 70, Col. 116432(s) 1969.

*Primary Examiner*—James O. Thomas, Jr.
*Attorney, Agent, or Firm*—Richards, Harris & Medlock

[57] ABSTRACT

The sugar concentration in a vegetable crop is increased by applying to the growing plants an effective sugar enhancing amount of biuret. The biuret is preferably applied directly to plant parts.

19 Claims, No Drawings

SUGAR PRODUCTION

This application is a Continuation-in-Part of copending patent application Ser. No. 135,811 filed Apr. 20, 1971 now abandoned.

This invention relates to sugar production. In another aspect, this invention relates to a novel method of increasing the sugar content in a vegetable crop by supplying an effective amount of biuret to the growing plants.

Sucrose is an important article of commerce which is obtained exclusively by extraction from natural vegetable products. Sugar beets and sugar cane are grown specifically to be processed for the recovery of crystalline sugar which is mainly sucrose. Other crops are enhanced in value if their content of sugar is higher. Examples of such other crops include oranges, pineapples, carrots, apples, watermelons, and the like. Even potatoes are more valuable for the production of "potato chips" if the sugar concentration in the raw potato is controlled. Vegetables in general are more palatable if the concentration of sugar is high in the part to be eaten.

Therefore, one object of this invention is to provide a method for increasing the sugar concentration in vegetable crops.

A further object of this invention is to provide a method of increasing the yield of crystalline sugar (sucrose) in crops specifically grown for the production of such crystalline sugar.

According to the invention, the concentration of sugar in a vegetable crop is increased by applying a sugar enhancing amount of biuret to the growing vegetables.

According to a preferred embodiment of this invention, a sugar enhancing amount of biuret is applied to a growing vegetable crop which is grown specifically to be processed for the recovery of crystalline sugar, such as sugar beets and sugar cane. to effect an increase in the crystalline sugar recovery from such crops and a proportional reduction of components (sodium, potassium, amino-nitrogen, raffinose, and kestose) which by their presence impede the recovery of crystalline sugar from the crops.

Biuret is a well known condensation product of urea having the structural formula:

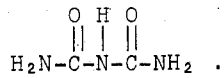

Furthermore, biuret has been generally considered to be a contaminant of "foliar-grade" urea fertilizer because higher concentrations of biuret have been reported to have caused adverse effects upon plant foliage. Accordingly, various processes have been developed such as disclosed in U.S. Pat. Nos. 3,185,731 and 3,251,879 for removing high concentrations of biuret from urea fertilizer. The increase in sugar concentration of growing vegetables treated with biuret in accordance with this invention is unexpected, especially in view of the numerous authorities which indicate the phytotoxic effects that biuret has upon plants. While the exact mechanism which enables the biuret to enhance the sugar concentration in a vegetable is not clear, it is theorized that biuret functions to retard the degradation of sucrose rather than actually stimulating the formation of sucrose. More specifically, sucrose is formed quite rapidly in vegetable crops by photosynthesis in the presence of $CO_2$. Also, it has been shown that sucrose is formed in wheat germ by reaction of uridine diphosphate glucose (UDP) under the influence of the enzyme named sucrose phosphate-UDP-transglucosylase. There are other enzymes which are also capable of causing the formation of sucrose. Thus, the formation of sucrose in vegetable crops is a naturally occurring phenomenon. However, in the biological system of a vegetable, sucrose exists in equilibrium with alpha-glucose-1-phosphate. The latter compound is an important building block for polysaccharide chains and ultimately starch. It is theorized that absorption by the plant of biuret causes a remarkable increase in the concentration of sucrose in the substance of the plant by inhibiting the formation of polysaccharide chains. Thus, evidently, the photosynthetic production of sucrose continues unobstructed while the reaction generating polysaccharides and starch in inhibited.

Biuret can be utilized within the scope of this invention to increase final sugar content in any vegetable wherein sugar is naturally produced. As used in the scope of this invention, a vegetable is broadly defined as having the nature of or being produced by a plant or growing in the manner of a plant, e.g., a member of the "vegetable kingdom." One embodiment of this invention is to actually enhance the normal crystalline sugar (sucrose) production from vegetable crops which are raised specifically to be processed for the recovery of crystalline sugar, such as sugar beets and sugar cane. Other vegetables which benefit by an increase in sugar content by the practice of this invention include potatoes, oranges, pineapples, carrots, apples, melon crops such as watermelons, and the like. The application of from about 0.001 to about 0.03 pounds of biuret per pound of sucrose normally produced in a plant species will enhance the sugar concentration therewithin in accordance with this invention. However, it is noted that beneficial applications of biuret both above and below this range can be advantageously applied in some circumstances. Generally, with the vegetable crops which are not ordinarily raised for the production of crystalline sugar, it is desirable to apply less biuret than with sugar crops such as sugar beets, which are grown to be processed for the recovery of crystalline sugar.

The application of biuret to the plant in any effective way which will allow the growing plant to absorb the biuret will increase the sugar concentration in the growing plant in accordance with this invention.

I have found that this effect can be obtained by treatment of the plant with biuret before or after emergence of the seedling. For example, the biuret can be applied to soil before or after the seed is planted, or the biuret can be applied to the plant or soil after the emergence of the seedling. The exact time of optimum effect will be determined by a large number of variables, including the method of application, the species and variety of plant, the character of the soil and the prevalence of rainfall or irrigation and the ambient temperature. The biuret can be applied to the crop as a solid, depending on rain to convey the chemical to the plant, or the crop can be sprayed using a solution of biuret in water. When spraying the biuret, the volume of liquid required can be minimized if the biuret is applied as a suspension in water. For many crops, including beets, the preferable mode of application for agricultural chemicals is from airplanes; any time after prolific growth has taken place. Because their foliage is ubiquitous, the airplane provides the only access to the fields without mechanical damage to the plants. Because the total weight of payload is a limitation, it is preferable to apply biuret to such crops as a concentrated suspension to minimize the amount of water which the plane must carry.

The optimum concentration for a particular application method and a particular crop is usually determined by empirical methods. The amount of biuret to be utilized should be that amount which will function to enhance the sugar production in plants but less than the amount which will yield phytotoxic effects in the plants. Generally, biuret can be applied to enhance sugar production in the vegetable crop in an amount from about 0.001 to about 0.03 pounds of biuret per pound of sugar normally produced within that particular vegetable crop. Thus, dependent upon the intended use and the form of application, the concentration of biuret in a plant-treating formulation may vary. Higher concentrations can be used in solid formulations used to contact the parts of the plant, such as the leaves. Lower concentrations can be used for example, when biuret is applied to the soil by watering. The biuret is preferably applied to the plants within a composition including a major effective portion of a carrier such as dust, water (in a water solution) or water and a wettable powder, and a minor effective portion of biuret. However, in some dust formulations, the biuret can comprise a major portion of the compositions.

Various forms of application of the biuret to the plants can be adapted to the intended use in the usual way by the addition of substances which improve the distribution, the adhesive properties, resistance to rain, and the like. Such substances include for example, fatty acids, resins, alkyl celluloses and other such agents as wetting agents, glue, casein, alignates, and crop oil (a purified paraffinic hydrocarbon). Additionally, the biological activity of plants can be increased by the addition of substances to the formulation which have a bacterial or fungicidal action or of substances which also influence the growth of plants. For example, fertilizers can also be added to the formulation when it is applied to soil.

Dusting compositions can be made by mixing or grinding together biuret in a solid carrier. Any suitable solid carrier can be utilized which is non-deleterious to the plant. For example, talcum, diatomaceous earth, kaolin, bentonite, calcium carbonate, attapulgus clay, and silica containing materials, can be used as well as powdered wood, powdered cork, charcoal and other materials of vegetable origin.

A preferred way of applying the biuret to the growing plant is in an aqueous emulsion or suspension. In this instance, the biuret is advantageously incorporated in a wettable powder with an effective amount of a suspending agent, and a wetting agent, or surfactant, and then later incorporated into an aqueous carrier.

More specifically, biuret is soluble to the extent of 0.5, 2.0, 25, and 91 grams per 100 grams of water at 0°, 25°, 75° and 100°C, respectively. Therefore, it could be inconvenient to apply biuret in aqueous solution at some dosage rates because of the large quantity of solution required for handling. For this reason, I have found it particularly advantageous to disperse and dispense biuret as a solid or an aqueous suspension of a wettable powder. This can be accomplished by grinding biuret to a fine powder and dispersing the resultant fine powder in a solution of wetting agent in water, for example.

For this dispersal of biuret it is generally preferable to have the biuret ground to <200 mesh (U.S. Standard) to insure good stability of the aqueous mixture.

A wettable powder can be prepared by fine-grinding a mixture of biuret, silica gel as a grinding aid, clay as a suspension agent, and a wetting agent.

Thus, when the biuret is used in a wettable powder formulation which is later mixed with water, it is generally preferable that a surfactant or wetting agent be added which will effectively enhance the adherence of the aqueous spray to the foliage and other plant parts. Any suitable surfactant which is non-deleterious to the plant can be utilized. Examples of suitable surfactants include lignin sulfonates; methyl oleyl taurates; polyoxyethylene; polyoxyethylene sorbitans such as polyoxyethylene sorbitan monolaurate, and polyoxyethylene sorbitan mono-oleate; polyethyleneoxide polyethylenediamine; mixtures thereof; and the like. The size of the particular particles in the wettable powder composition is not critical as long as the particles are fine enough to be suspended. Generally the size of the particles is dependent upon the spraying equipment which is utilized to apply the ultimate aqueous composition. The particles should have a size smaller than 50 mesh (U.S. Standard) and preferably smaller than 200 mesh (U.S. Standard), and even more preferably smaller than 325 mesh (U.S. Standard). Generally the spraying and dispersing efficiency of the composition will increase as the particle size of the components decreases. Suitable suspension agents include clays such as bentonite, bardenite, and attapulgus clay. These clays stabilize the wettable powder formulations while they are dry, and also serve as suspension agents when the formulations are admixed with water.

The following example is given to better facilitate the understanding of this invention and is not intended to limit the scope thereof.

EXAMPLE I

This example illustrates the effect of biuret on the sugar production of Minnesota sugar beets. The biuret was applied to the sugar beets in the form of an aqueous suspension, which was formulated by initially preparing a wettable powder by fine grinding (smaller than 100 mesh U.S. Standard) a mixture of biuret, a clay suspending agent, silica flour as a grinding aid, and a sodium lignin sulfonate wetting agent sold under the trademark of Reax–45A. The proportions of the ingredients utilized in the wettable powder mixture are set forth in Table I below:

TABLE I

| Ingredients | Amount (lbs.) |
|---|---|
| Biuret hydrate (10% water) | 90 |
| Silica flour | 10 |
| Barden clay (attapulgus) | 5 |
| Reax-45A (a sodium lignin sulfonate) | 5 |

The wettable powder set forth in Table I was suspended in water at various concentrations and sprayed on the foliage of the sugar beets 6 weeks before harvest. After the application, the spray dried and appeared as a white residue on the leaves of the sugar beets for a substantial period of time thereafter. No adverse reaction could be seen in the color, shape or disposition of the leaves. Table II below shows that the sugar concentration in the beets at harvest time is directly related to the amount of biuret which was applied to the foliage.

TABLE II

BIURET TREATMENT OF SUGAR BEETS
Analysis of Beets

| Biuret lbs/acre | Na (ppm) | K (ppm) | Amino Nitrogen (ppm) | Sugar (wt%) | Raffinose (wt%) | Kestose (wt%) | Impurity Index |
|---|---|---|---|---|---|---|---|
| None | 350 | 4380 | 402 | 12.0 | .57 | .10 | 1349 |
| 12½ | 350 | 4580 | 371 | 11.4 | .87 | .13 | 1437 |
| 25 | 350 | 4950 | 331 | 12.2 | .54 | .09 | 1386 |
| 50 | 290 | 4820 | 371 | 13.0 | .61 | .11 | 1290 |
| 100 | 220 | 3820 | 348 | 14.1 | .56 | .10 | 978 |

It was found that the reaction which took place in the plants not only provided more sucrose (crystalline sugar) but also proportionally reduced the concentration of other components (Na, K, Amino-Nitrogen, Raffinose and Kestose) which by their presence impede the recovery of crystalline sugar from the crop. The data in Table II were determined by standard techniques which include initially pulping a sample of the sugar beets and then clarifying the resulting molasses with lead sulfate and thereafter measuring the sugar content in 26 grams of the molasses with a polarimeter. The impurity index set forth in Table II is the standard impurity index utilized by the United States Department of Agriculture to evaluate sugar purity and is determined by entering the parts per million that remain of sodium, potassium, amino-nitrogen, and weight percent sugar as determined in the above-described analysis into the empirical formula set forth below:

$$\text{Impurity index} = \frac{3.5\text{Na} + 2.5\text{K} + 9.5 \text{ amino-nitrogen}}{\text{Weight percent sugar}}$$

Therefore, the impurity index is an empirical expression related to the amount of sucrose which cannot be recovered from the syrup and the measure of sodium, potassium, amino-nitrogen, and the non-crystalline sugar's raffinose and kestose indicates the measure of components, which by their presence impede the recovery of crystal sugar from the crop. Thus, the best beets for the production of crystalline sugar exhibit the lowest impurity index. As shown, the application of about 20 pounds per acre of biuret resulted in a substantial increase of crystalline sugar in the crop, and increasing amounts of up to and including 100 pounds of biuret per acre shows further increases in the sugar content, and particularly the recoverable crystalline sugar content of the crop.

EXAMPLE II

A wettable powder was prepared by finely grinding to a particle size of less than 200 mesh (U.S. Standard) a mixture of biuret, an attapulgus clay suspension agent, silica flour as a grinding aid and two surfactants - a lignin sulfonate sold under the trademark of Marasperse N, and a methyl oleyl taurate sold under the trademark of Igepon T-77. The mixture of ingredients had the formulation set forth in TABLE III below:

TABLE III

| Ingredient | Amount (lb.) |
|---|---|
| Biuret hydrate | 90 |
| Silica flour | 10 |
| Attapulgus clay | 5 |
| Igepon T-77 | 3 |
| Marasperse N | 2 |

The powder suspended in water was applied at concentration levels of 12.5 and 25 lbs./acre to a Minnesota sugar beet crop immediately after the seeds were planted but before the plants had emerged. Within six weeks of emergence, the test plots were observed for toxicity symptoms. None were evident. At harvest, samples were removed and processed for measurement of yield, sugar content and impurity level in the manner set forth in Example I. TABLE IV provides the resultant values for sugar percentage and impurity. It is noted that the tests performed in this Example utilized carefully randomized distribution of treatments and the numbers shown in TABLE IV each represent the average of 15 samples.

TABLE IV

BIURET PRODUCTION OF BEET SUGAR

| Biuret Dosage Lbs/Acre | Sugar Conc. % | Beet Production Ton/Acre | Gross Sugar Yield Lb/Acre | Impurities (ppm) | | | Impurity Index | Sugar Loss Lbs/Acre | Effective Sugar Production (Extractable sugar) Lbs./Acre |
| | | | | N | K | Amino N | | | |
|---|---|---|---|---|---|---|---|---|---|
| 0 | 14.7 | 17.2 | 5060 | 577 | 2424 | 396 | 806 | 612 | 4448 |
| 12.5 | 15.1 | 17.5 | 5280 | 540 | 2122 | 342 | 692 | 548 | 4732 |
| 25 | 15.3 | 18.5 | 5660 | 556 | 1922 | 301 | 628 | 533 | 5127 |

As seen from TABLE IV, increasing dosages of biuret increases the concentration of sugar in the beets. It also increases the yield of beets per acre. It also decreases the concentrations of impurities in the beets. Each of these effects contributes to the increase in recoverable sugar indicated in TABLE IV.

Thus, the data indicates that the plots treated at 25 lbs. per acre not only had the highest average concentration of sugar, but they also produced the most quantity of beets per acre. This is an important contribution of my invention, in view of the fact that nitrogen compounds are not ordinarily good sugar producers. Ordinary nitrogen fertilizers can be made to produce increased quantities of beets, but result in an increase in impurities and decrease in sugar concentration.

While this invention has been described in relation to its preferred embodiments, it is to be understood that various modifications thereof will now be apparent to one skilled in the art upon reading this specification and it is intended to cover such modifications as fall within the scope of the appended claims.

I claim:

1. A method of increasing sucrose recoverable as crystalline sugar from a vegetable crop specifically grown to be processed for the recovery of crystalline sugar comprising applying to the growing plants of said crop an effective amount of biuret to cause an increase of sucrose content in said plants.

2. The method of claim 1 wherein the total weight of said vegetable crop is also increased.

3. The method of claim 1 wherein the production of sodium, potassium, amino-nitrogen, raffinose and kestose is not substantially increased.

4. The method of claim 1 wherein said vegetable crop is sugar beets.

5. The method of claim 1 wherein said vegetable crop is sugar cane.

6. The method of claim 1 wherein said biuret is applied to said plants in amounts from about 0.001 to about 0.03 pounds of biuret per pound of sucrose normally produced within said plant.

7. The method of claim 1 wherein said biuret is applied to the soil in which said growing plants are grown.

8. The method of claim 1 wherein said biuret is applied to the foliage of said growing plants.

9. The method of claim 8 wherein said biuret is applied to said foliage in aqueous suspension.

10. The method of claim 8 wherein said biuret is applied to said foliage in a water solution.

11. The method of claim 8 wherein said biuret is applied to said foliage as a solid.

12. A method of increasing sucrose recoverable as crystalline sugar from a vegetable crop specifically grown to be processed for the recovery of crystalline sugar, and not substantially increasing the production of sodium, potassium, amino-nitrogen, raffinose, and kestose, comprising, applying biuret to said growing plants of said crop in amounts from about 0.001 to about 0.03 pounds of biuret per pound of sucrose normally produced within said plant to cause an increase of sucrose content in said plants.

13. The method of claim 12 wherein said vegetable crop is sugar cane.

14. The method of claim 12 wherein said vegetable crop is sugar beets.

15. The method of claim 14 wherein said biuret is applied to the soil in which said growing plants are grown.

16. The method of claim 14 wherein said biuret is applied to the foliage of said growing plants.

17. The method of claim 16 wherein said biuret is applied to said foliage in aqueous suspension.

18. The method of claim 16 wherein said biuret is applied to said foliage in a water solution.

19. The method of claim 16 wherein said biuret is applied to said foliage as a solid.

* * * * *

PO-1050
(5/69)

UNITED STATES PATENT OFFICE
CERTIFICATE OF CORRECTION

Patent No. 3,860,411                  Dated   January 14, 1975

Inventor(s)   Martin L. Weakley

It is certified that error appears in the above-identified patent and that said Letters Patent are hereby corrected as shown below:

First page, under "Other Publications" insert references stated on Page 2, Form PO--892 of Paper No. 7:

--Jurkowska, Acta Agr. Silvestria, Ser. Agr. 7,
    (1) 3-21 (1967)
Kipitov et al. Rastenievud Nauki (Sofia) 4 (12)
    75-87 (1967)
Ogata et al. Sci. Repts. Matsuyania Agr. Coll.
    No. 12, 15-22 (1954)
Smika et al., Soil Science 84, 273-82 (1957)
Smith et al. Soil Science Society of America
    Proc. 10, 197-201 (1945)--.

Signed and sealed this 1st day of April 1975.

(SEAL)
Attest:

RUTH C. MASON
Attesting Officer

C. MARSHALL DANN
Commissioner of Patents
and Trademarks